(12) United States Patent
Arora (10) Patent No.: US 6,598,156 B1
(45) Date of Patent: Jul. 22, 2003

(54) MECHANISM FOR HANDLING FAILING LOAD CHECK INSTRUCTIONS

(75) Inventor: Judge K. Arora, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,308

(22) Filed: Dec. 23, 1999

(51) Int. Cl.$^7$ ................................. G06F 9/38
(52) U.S. Cl. .................... 712/244; 712/216; 712/217
(58) Field of Search ................ 712/207, 213, 712/215, 216, 244; 711/125, 129

(56) References Cited

U.S. PATENT DOCUMENTS

| | | |
|---|---|---|
| 5,404,484 A | 4/1995 | Schlansker et al. |
| 5,625,835 A * | 4/1997 | Ebcioglu et al. ............... 712/23 |
| 5,812,810 A | 9/1998 | Sager |
| 5,870,579 A | 2/1999 | Tan |
| 5,903,749 A | 5/1999 | Kenner et al. |

FOREIGN PATENT DOCUMENTS

| | | |
|---|---|---|
| WO | 99/19795 | 4/1999 |

* cited by examiner

*Primary Examiner*—William M. Treat
(74) *Attorney, Agent, or Firm*—Teresa Wong (57) ABSTRACT

A mechanism is provided for recovering from a failing load check instruction in a processor that implements advanced load instructions. An advanced load address table (ALAT) tracks status information for the advanced load instruction. The status information is read when an associated load check operation is processed, and an exception is triggered if the status information indicates data returned by the advanced load operation was modified by a subsequent store operation. The load check instruction is converted to a load operation, instructions are flushed from the processor's instruction execution pipeline, and the pipeline is resteered to the first instruction that follows the load check instruction.

28 Claims, 7 Drawing Sheets

MECHANISM FOR HANDLING FAILING LOAD CHECK INSTRUCTIONS

BACKGROUND OF THE INVENTION

1. Technical Field

The present invention relates to methods for processing load operations, and in particular to methods for processing load operations prior to store operations that may target overlapping memory addresses.

2. Background Art

Currently available processors are capable of executing instructions at very high speeds. These processors typically implement pipelined, superscalar micro-architectures that can execute multiple instructions per clock cycle at clock frequencies approaching one gigahertz or more. In recent years, the instruction executing capabilities of processors have begun to outstrip computer systems' capacities to provide instructions and/or data for processing.

One bottleneck in supplying the processor with data/instructions is the relatively long latency of the load operations that transfer data from the computer's memory system into the processor's registers. A typical memory system includes a hierarchy of caches and a main memory. The latency of the load depends on where in the hierarchy the targeted data is found, i.e. the cache in which the load operation "hits". For example, a load hit in the primary or first level cache, i.e. the cache closest to the processor core, may have a latency of 1 to 2 clock cycles. Load hits in higher level caches further from the processor core have larger latencies. For example, the secondary and tertiary caches may have latencies of 4 to 8 clock cycles or 10 or so more clock cycles, respectively. If the data is only available from main memory, the load latency can be on the order of 100–200 clock cycles.

To avoid idling the processor, a compiler typically schedules load operations in a program flow well before the operation that uses the target data. Compiler scheduling occurs before the program is executed and, consequently, before any run-time information is available. As a result, store operations, which transfer data from the processor's registers into the memory system, can limit this load-scheduling strategy. If a compiler moves a load that returns data from a specified memory address ahead of a store that writes data to the same memory address, the load will return stale data. That is, the load will not observe the effects of the store that preceded the load in execution order. As long as the compiler can determine the memory addresses specified by the load and store from available information, it can determine whether it is safe to move the load ahead of the store. The process of identifying memory addresses to determine overlap is referred to as memory disambiguation.

In many instances, it is not possible to disambiguate memory references at the time the corresponding load and store operations are scheduled. For example, the memory address referenced by an operation may depend on variables that are determined at run-time, just before the operation is executed. For load/store pairs that can not be disambiguated at compile time, certain advanced compilers can still reschedule the load ahead of the store using an "advanced load". In an advanced load, the load operation is scheduled ahead of a potentially conflicting store operation, and a check operation is inserted in the instruction flow, following the store operation. The load and store memory references are resolved when the corresponding instructions are executed. The check operation determines whether these dynamically-resolved memory references overlap and initiates a recovery procedure if they do.

The instruction movement that accompanies an advanced load operation is illustrated by the following instruction sequence, where LOAD, STORE, ALOAD, and LOAD CHECK represent the load, store, advanced load, and check operations, and x and y represent the undisambiguated memory references.

| WITHOUT ADVANCED LOADING | WITH ADVANCED LOADING |
|---|---|
| INSTRUCTION A | ALOAD reg2, mem[y] |
| . | INSTRUCTION A |
| . | . |
| . | . |
| INSTRUCTION B | . |
| STORE reg1, mem[x] | INSTRUCTION B |
| LOAD reg2, mem[y] | STORE reg1, mem[x] |
| ADD reg2, reg3 | LOAD CHECK |
|  | ADD reg2, reg3 |

The advanced load adds a check operation (LOAD CHECK) to the program flow. The check operation takes time to complete, which can delay the time at which the ADD instruction (and any other instructions that depend on the load) is retired. To fully realize the benefits of advanced loads, a processor must provide efficient mechanisms to implement the operations necessary to support advanced loads. These operations include, for example, checking for a load store conflict, and when a conflict is detected, canceling any instructions that may have used the resulting stale data, retrieving the updated data, and re-executing the canceled instructions. Delays due to inefficiencies in any of these operations can offset the benefits provided by advancing loads.

The present invention addresses these and other problems related to processing advanced load operations.

SUMMARY OF THE INVENTION

The present invention provides an efficient mechanism for recovering from a failed load check operation.

In accordance with the present invention, a first load operation is executed to a memory address. A subsequent, load check operation checks the status of the load operation at a table entry associated with the memory address. The load check operation is converted to a load operation if the status indicates that data returned by the first load operation is stale, and a recovery operation is implemented.

For one embodiment of the invention, the recovery operation is implemented as a micro-architectural trap. The trap flushes the instruction pipeline and resteers the processor to an instruction following the check load operation.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the appended claims.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for recovering from a collision between an advanced load operation and a subsequent store operation. In the following discussion, an advanced load refers to a load operation that is scheduled ahead of an undisambiguated store. The advanced load and the store may reference memory addresses that overlap. When the memory addresses overlap, the (advanced) load and store are said to collide. Embodiments of the present invention employ a check load operation to detect these collisions.

An alternate embodiment of the present invention may employ approximate mechanisms to check for collisions between advanced loads and stores. The approximate approach reduces the time and hardware necessary to search for collisions. For example, one such mechanism compares a subset of the memory address bits to predict whether a collision occurs. In the following discussion, "collision" refers to memory addresses that either overlap when a full address comparison is employed or potentially overlap when an approximate address comparison is employed. Similarly, references to memory addresses that "overlap" include memory address that may only potentially overlap.

In accordance with the present invention, a check load operation reads an advanced load address table (ALAT) to determine whether an associated advanced load operation collided with an intervening store operation. If no collision is indicated, the load check operation is treated as a no-operation (NOP). If a collision is indicated, the check load operation is converted to a load, and the instruction pipeline of the processor executing the check load operation is flushed and resteered to the instruction that follows the check load operation. For one embodiment of the invention, cache control logic converts the check load operation to a load operation when a collision is indicated.

Figure 1:
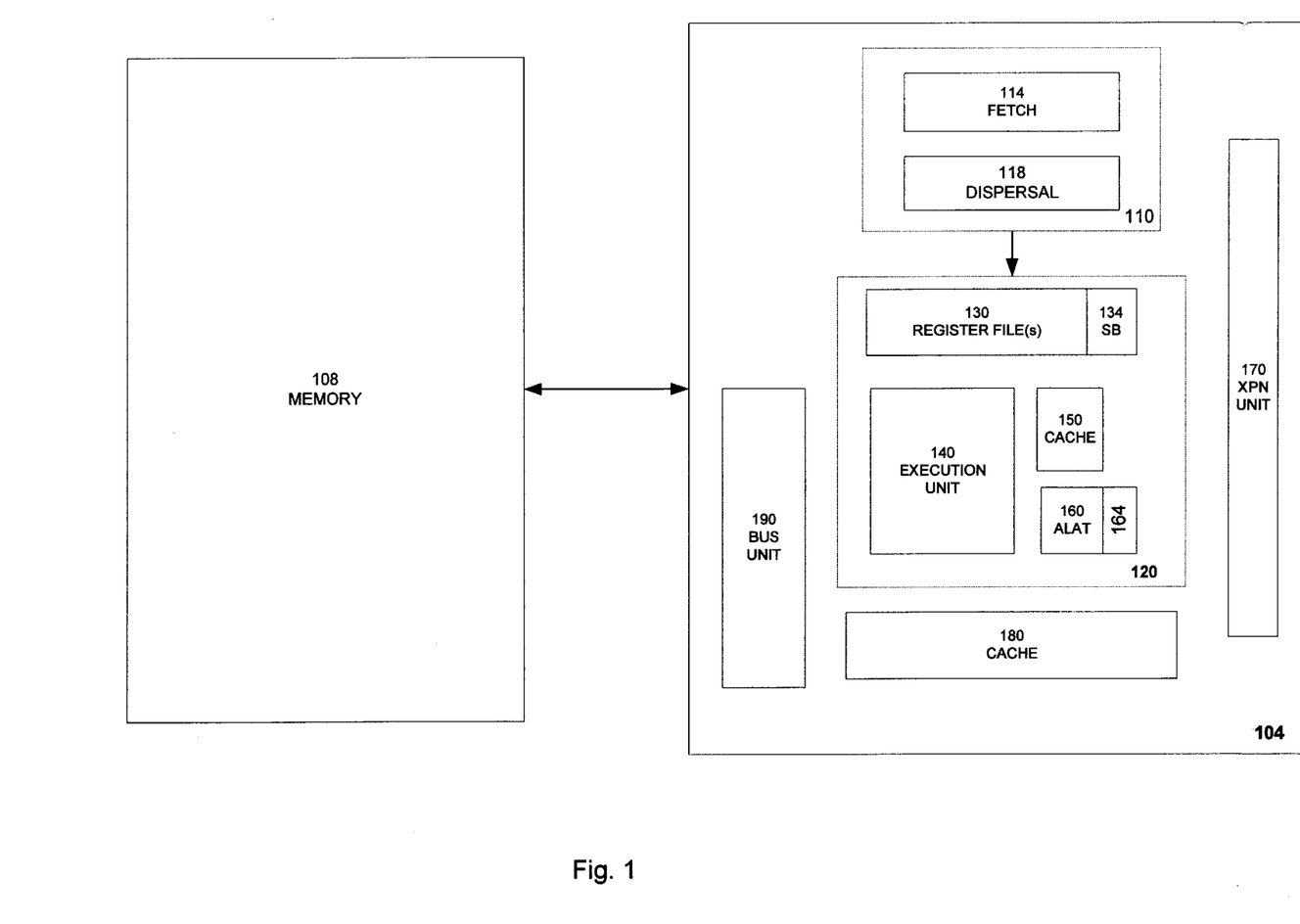
FIG. 1 is a block diagram of one embodiment of a computer system in which the present invention may be implemented.

FIG. 1 is a block diagram of one embodiment of a system 100 that is suitable for implementing the present invention. System 100 includes a processor 104 and a memory 108 that are typically coupled through system logic (not shown). The resources of processor 104 are organized into an instruction execution pipeline having a front end 110 and a back end 120. Front end 110 fetches instructions and issues them to resources in back end 120 for execution.

The disclosed embodiment of front end 110 includes a fetch unit 114 and a decoder or dispersal unit 118. Fetch unit 114 includes circuitry to retrieve instructions from various memory structures, e.g. memory 108 or an instruction cache (not shown), and provide them to the other resources of processor 104. Fetch unit 114 also typically includes branch prediction resources to anticipate control flow changes and an instruction cache to store instructions for processing. The fetched instructions are provided to dispersal unit 118, which includes circuitry to direct them to appropriate resources in back end 120 for execution.

For one embodiment of the invention, processor 104 fetches and issues multiple instructions on each cycle of the processor clock. Instructions issued to back end 120 concurrently are referred to as an issue group. The instructions of an issue group are staged down the instruction execution pipeline together.

For the disclosed embodiment of processor 104, back end 120 includes a register file 130, execution module 140, a primary cache 150, and an advanced load address table (ALAT) 160. A scoreboard 134 is associated with register file 130 to track the availability of data in the entries ("registers") of register file 130. Execution module 140 typically includes different execution units for the different types of instructions. For example, execution module 140 may include one or more integer (IEU), memory (MU), floating point (FPU), and branch (BRU) execution units to handle integer, load/store, floating point, and branch operations, respectively.

The disclosed embodiment of processor 104 also includes an exception/commit unit (XPN) 170, asecondary cache 180, and a bus unit 190. Bus unit 190 controls communications between processor 104 and off-chip resources such as memory 108 and off-chip caches if present (see below). XPN 170 monitors the various resources in front end 110 and back end 120 to determine which instructions should be retired when they reach the end of the instruction execution pipeline. In particular, XPN 170 monitors these resources for exceptional conditions ("exceptions") and adjusts the instruction flow through processor 104 accordingly. For one embodiment of the invention, XPN 170 monitors ALAT 160 to determine whether a check load instruction fails and adjusts the operation of processor 104 when a failing check load instruction is detected.

Embodiments of processor 104 may include tertiary and higher level caches (not shown). For example, a tertiary cache may be included on the same chip as processor 104 or on a separate chip. When a tertiary cache is provided off-chip, bus unit 190 controls communications between processor 104 and the off-chip cache. Caches 150, 180 (plus any higher level caches) and memory 108 form a memory hierarchy for computer system 100 to provide data to the resources of back end 120. The present invention does not depend on the detailed structure of the memory hierarchy.

Instructions issued to back end 120 operate on data (operands) that are provided from register file 130 or bypassed to execution module 140 from various components of the memory hierarchy or other execution units. Register file 130 may include separate register files for integer and floating point data. Scoreboard 134 is used to track the availability of data in the entries ("registers") of register file 130. Operand data is transferred to and from these registers through various types of load and store operations, respectively, and scoreboard 134 is updated accordingly. A load operation searches the memory subsystem for data at a specified memory address, and returns the data to register file 130 from the level of the hierarchy nearest to the processor core in which the requested data is available. A store writes data from a register in file 130 to one or more levels of the memory hierarchy.

ALAT 160 includes multiple entries to track the memory addresses of data targeted by advanced load operations. For one embodiment of ALAT 160, each entry can be set to indicate the target memory address of an advanced load, the register for which the contents of the target memory address are destined ("target register"), and a status of the target address. When an advanced load is detected, indications of the target address and target register are stored in an entry, and a status bit is set to indicate that the target address/register information is valid. ALAT 160 also includes a monitor unit 164 to observe selected load and store transactions and update the ALAT entries accordingly. For example, if an address targeted by store overlaps a target address in ALAT 160, the status bit is set to indicate that the entry is no longer valid. For one embodiment of the invention, a corresponding bit in a scoreboard unit is updated to indicate that data returned by the advanced load is not valid. The collision between the advanced load and store addresses means the data returned by the advanced load may be stale. A check load instruction triggers a read of ALAT 160 to determine if a recovery operation is necessary.

Figure 2:
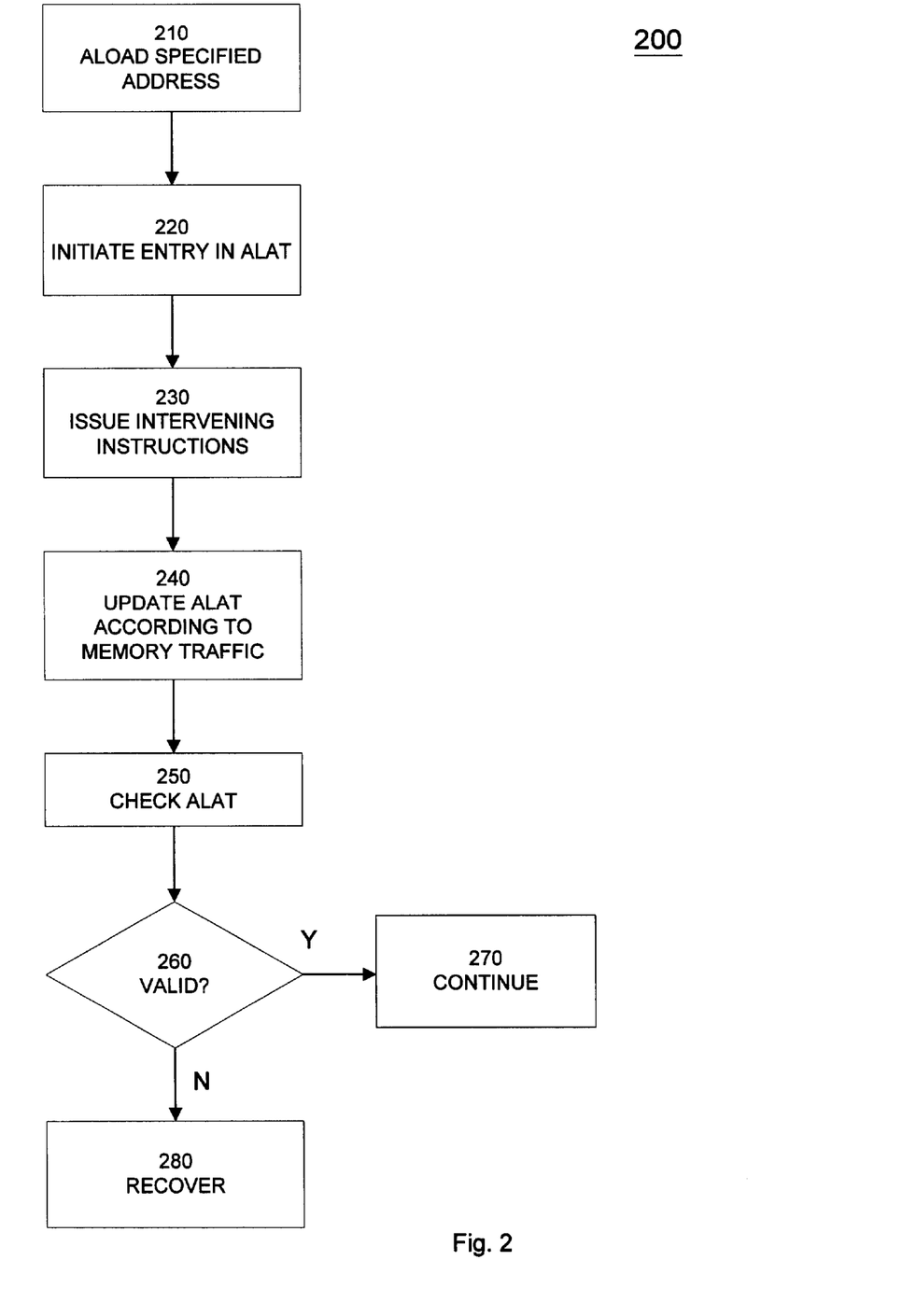
FIG. 2 is a flowchart representing a method for implementing an advanced load operation using an advanced load address table (ALAT) to track selected load and store operations.

FIG. 2 is a flowchart representing a method 200 for implementing an advanced load operation, using an ALAT or equivalent tracking mechanism. An advanced load is executed 210 and an entry is made 220 in the ALAT, identifying the target memory address from which the data is loaded. Intervening instructions 230 are issued and monitor circuitry updates 240 the ALAT according to selected store and load operations. For example, stores by a register stack engine and later load operations need not be monitored. For one embodiment, the monitor circuitry compares the memory address referenced by the store with the memory addresses (or portions of memory addresses) in the ALAT. If a match is detected, the entry associated with the matching memory address is invalidated. As noted above, other embodiments may employ an "imperfect match scheme" that compares only some address bits to identify potential collisions.

The check operation is typically implemented 250 at the point in the original program order at which the load operation was originally located, i.e. its location prior to being rescheduled above the undisambiguated store. The check operation reads the ALAT entry associated with memory address referenced by the advanced load. If the entry is valid 260, the results returned by the advanced load are assumed to be valid (not stale) and processing continues 270. If the entry is invalid 260, the results returned by the advanced load are assumed to be "stale", i.e. one or more relevant store operations may have updated the memory address after it was accessed by the advanced load. In this case, a recovery procedure is executed 280. The present invention provides a mechanism for handling such failing check loads efficiently.

While the operations of method 200 are shown sequentially, the present invention is not limited to the disclosed sequence. For example, executing 210 the advanced load and initiating 220 the ALAT entry may occur in parallel or the ALAT entry may be initiated before the advanced load is executed. Similalry, monitoring the intervening instructions and updating the ALAT accordingly may occur in parallel. In general, the disclosed methods permit certain operations that are shown as sequential to be reordered or implemented in parallel, and the present invention is not limited to the specific ordering shown. Persons skilled in the art and having the benefit of this disclosure will recognize where particular sequences are to be observed.

A processor performs a number of functions to recover from a failed load check operations. It retrieves the correct data, identifies and eliminates any operations that may have used the incorrect (stale) data, and adjusts the processor controls to repeat selected operations using the correct load data. Here, "correct data" refers to the data written to the memory address (or portion of the memory address) by the more recent, conflicting store operation.

For one embodiment of the invention, the load check is designed to provide fast execution for the case in which the associated advanced load does not collide with an undisambiguated store. For example, the load check may not cause tracking logic, e.g. scoreboard 134, to mark as unavailable the register to which the target data is returned. This allows instructions that depend on the target data to execute concurrently with or after the load check instruction, using the data returned by the advanced load. For the exemplary code sequence, the CHECK LOAD and ADD instructions may be executed in parallel.

Figure 3:
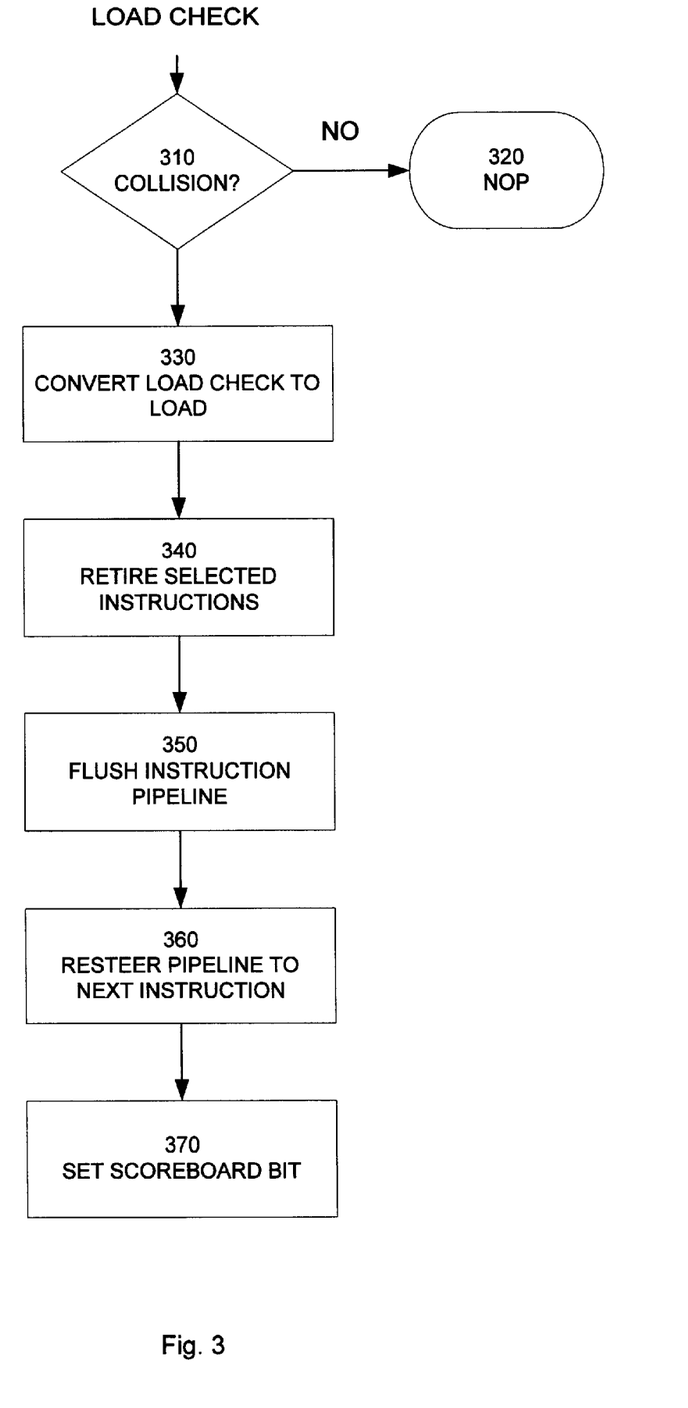
FIG. 3 is a flowchart representing one embodiment of a method in accordance with the present invention for recovering from a failing load check operation.

FIG. 3 is a flow chart representing one embodiment of a method 300 in accordance with the present invention for recovering from a check load operation that detects a (potential) collision between an advanced load and a relevant, undisambiguated store ("failing load check"). If no collision is detected 310, the load check is treated as a NOP 320 and method 300 is exited. If a collision is detected 310, the load check is converted 330 to a load to retrieve the updated data from the memory system. Since the load check operation is scheduled after any undisambiguated store operations that potentially update the memory address targeted by the advanced load, the correct data is available to the converted load check.

Some instructions in the same issue group as the load check instruction may retire even if the load check operation fails. An instruction is said to retire if it is allowed to update the architectural state of the processor. For the disclosed embodiment of method 300, instructions that precede the failed load check instruction in execution order are retired 340.

The stale data detected 310 by the load check operation may be used by instructions scheduled after the load check operation. As noted above, one embodiment of the check load operation does not cause the scoreboard to mark its target register as unavailable. This allows dependent instructions to proceed with the data returned by the advanced load. However, this also means that if the load check fails, these in-flight instructions should be canceled and re-executed. Other embodiments of the invention may employ different mechanisms to hold off execution of dependent instructions.

For method 300, dependent instructions are canceled by flushing 350 the instruction pipeline and resteering 360 the processor to the instruction that follows the check load operation. To prevent these instructions from using the stale data before the correct data is returned by the check load operation, the target register is marked 370 as unavailable. For one embodiment of the invention, a scoreboard bit associated with the target register may be set to indicate that the updated data has not been returned yet. This bit may be reset when the updated load data is returned by the load that is spawned by the failing check load operation.

Figure 4:
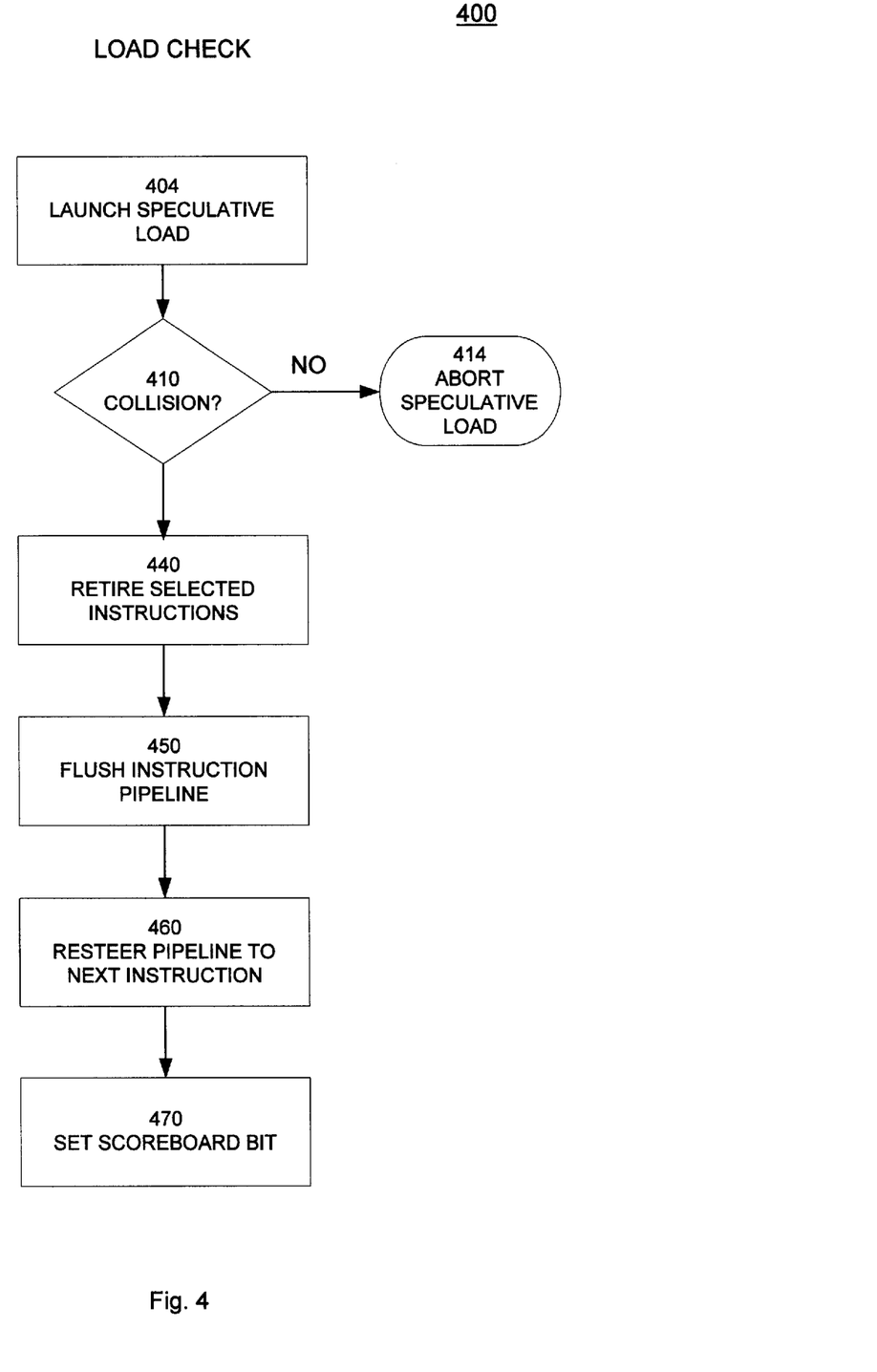
FIG. 4 is a flowchart representing another embodiment of a method in accordance with the present invention for recovering from a failing load check operation.

FIG. 4 represents another embodiment of a method 400 for handling failing load check instructions in accordance with the present invention. Method 400 is a variation on method 300 where the load check launches 404 a load (reload) operation speculatively, before checking 410 for a collision. If no collision is detected 410, the reload is aborted 414. This may be done, for example, by converting the speculative load to a NOP. If a collision is detected 410, method 400 retires 440 selected instructions, flushes 450 the instruction pipeline, resteers 460 the pipeline to the instruction following the failed load check and sets 470 the scoreboard bit.

Figure 5:
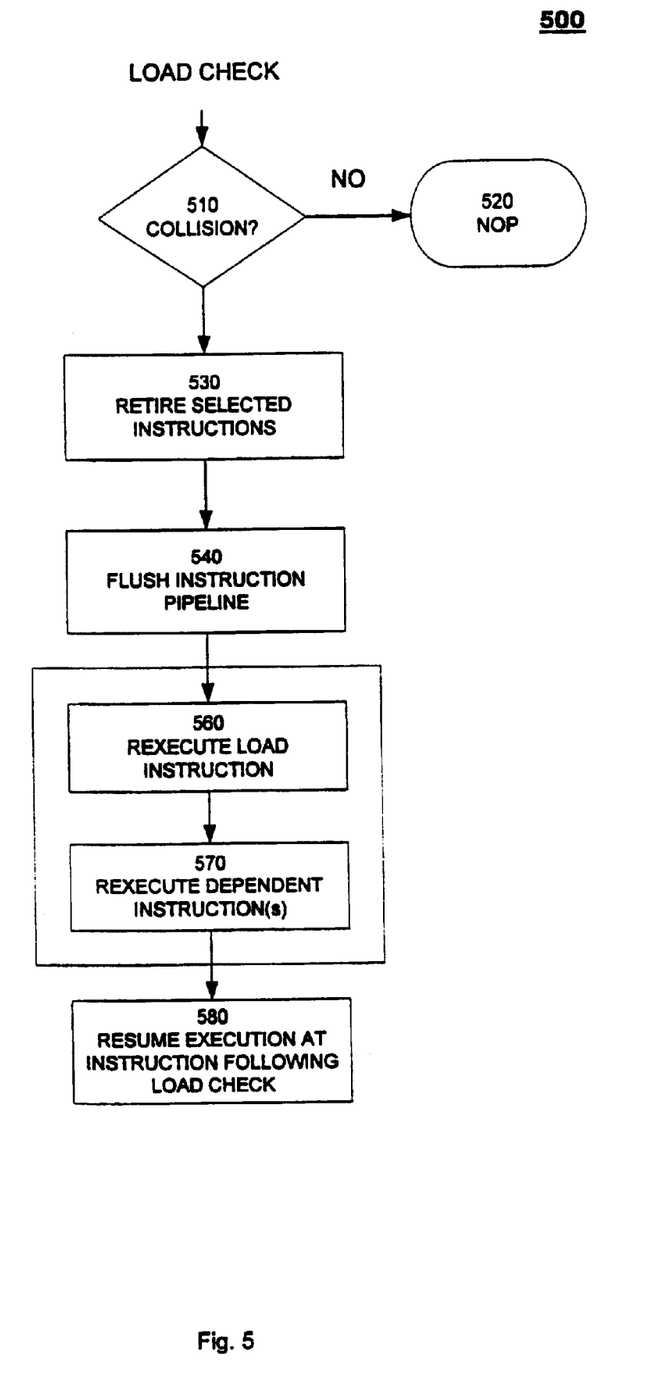
FIG. 5 is a flow chart represent yet another embodiment of a method in accordance with the present invention for recovering from a failing load check operation.

FIG. 5 is a flowchart representing yet another embodiment of a method 500 for recovering from failing load check operations. Method 500 may be used when instructions that depend on the data returned by the advanced load instruction are also rescheduled ahead of an undisambiguated store instruction. The dependent instructions are executed ahead of the load check instruction, and they are also retired before the load check, if no intervening exception arises. If the load check detects a collision, data used by the dependent instructions is stale, and any effects their results have on the architectural state of the processor need to be addressed.

For one embodiment of the invention, a compiler may advance dependent instructions in this manner, provided it also generates a recovery routine or "fix-up code" at compile time. The recovery routine may be accessed in the event the check load operation indicates a mismatch. The recovery routine includes instructions to reset the register targeted by the advanced load operation with the correct data value, e.g. the value returned by the second load, and repeat any dependent instructions using the corrected register values. Method 500 implements an error handler routine to effect the recovery.

For method 500, the load check determines 510 whether a potential collision occurred. If no collision is detected 510, the load portion of the load check is treated 520 as a NOP. If a collision is detected 510, selected instructions are retired 530. The retired instructions include, for example, instructions in the issue group of the load check that precede the load check in execution order. The instruction pipeline is flushed 540 to eliminate any in-flight instructions that may depend directly or indirectly on the stale data. Control of the processor is then passed to an error handling routine, which completes the recovery operation.

For one embodiment of the invention, the error handling routine is "fix-up code" that is aware of any instructions that depend directly or indirectly on the data returned by the advanced load instruction. The load instruction is re-executed 560, and the dependent instructions are re-executed 570, using the data provided by the re-executed load. The processor's architectural state is corrected when these re-executed instructions are retired, and execution resumes 580 with the instruction following the failed load check instruction.

As indicated with respect to FIG. 2, various operations of methods 300, 400 and 500 may be implemented in orders that are different from those indicated. In addition, methods 300, 400, and 500 may be implemented in whole or in part through a micro-trap mechanism. The micro-trap mechanism may be better appreciated with reference to a particular embodiment of XPN unit 170.

Figure 6:
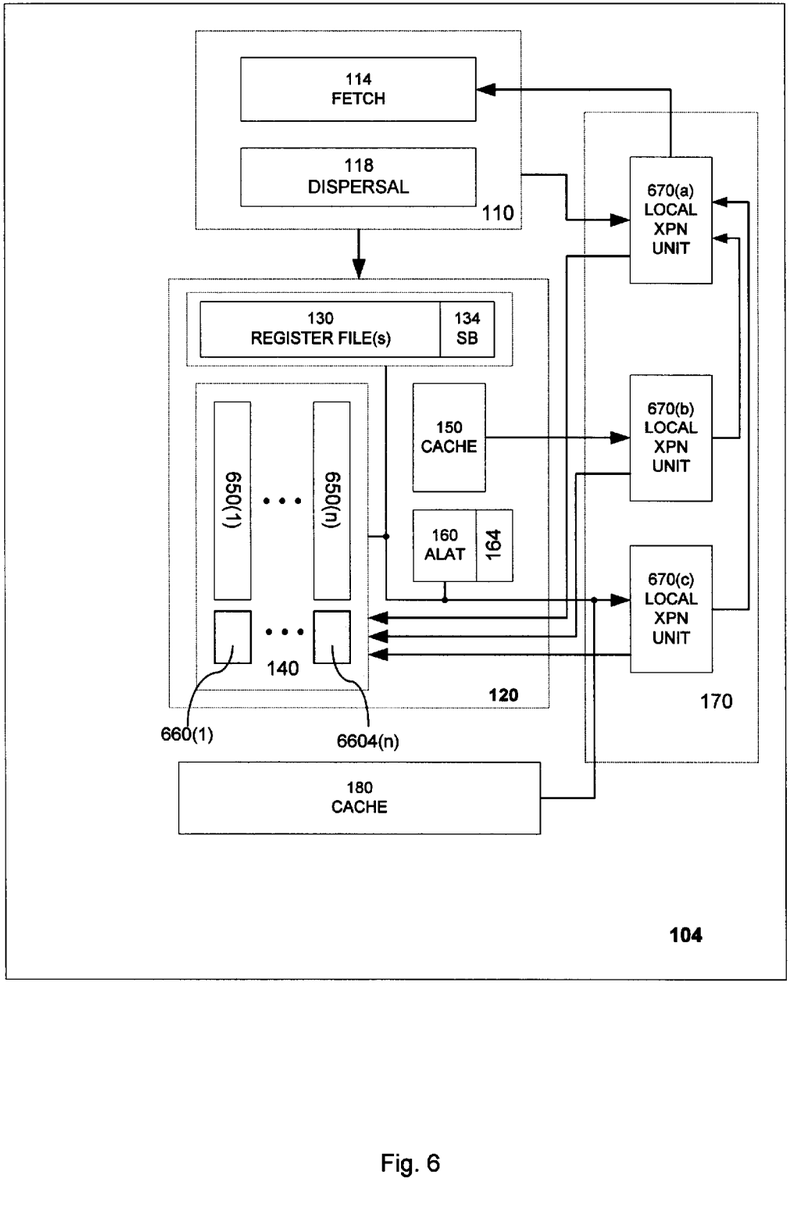
FIG. 6 is a block diagram of an embodiment of the exception/commit unit of FIG. 1 that is suitable for implementing the methods of FIGS. 3, 4, and 5 as a microarchitectural traps.

FIG. 6 is a block diagram of processor 104, including details of one embodiment of XPN 170 that is suitable for implementing the present invention. The disclosed embodiment of XPN 170 has a decentralized structure comprising local exception units 670(*a*), 670(*b*), and 670(*c*) (generically, "local exception unit" 670) to reduce signal transmission times and routing congestion. The present invention does not require a decentralized structure for XPN 170, and where timing and routing considerations permit, the operations described below may be implemented through an embodiment of XPN 170 having a centralized exception processing unit.

Portions of processor 104 that are common to FIGS. 1 and 5 are indicated with the same reference numbers. For example, instruction fetch unit 114, instruction dispersal unit 118, execution module 140, cache 150 and cache 180 are indicated in FIG. 6. Execution module 140 includes multiple execution units 650(*l*)–150(*n*) (generically, "execution unit 650") which represent, for example, one or more IEUs, FPUs, MUs, and BRUs. Execution units 650(*l*)–650(*n*) are terminated with retirement ports 660(*l*)–660(*n*), respectively (generically, retirement port 660). Retirement ports 660 are staging latches that control the retirement of instructions processed by their corresponding execution units 650.

For exception handling operations, each retirement port 660 represents to XPN 170 the processor resources used to implement an instruction that has reached the final stage of its corresponding execution unit 650. Each instruction in an issue group is retired from its retirement port 660 or ignored, depending on the state of the global commit signal for its execution port 654.

For the disclosed embodiment of XPN 170, each local exception unit 670 processes exception signals from the pipeline resources that are proximate to it ("local resources"). For example, local exception unit 670(*a*) receives exception signals generated by fetch unit 114 and instruction dispersal unit 118. Similarly, local exception unit 670(*c*) receives exception signals generated by execution units 650, ALAT 160, and cache 180. Local exception unit 670(*b*) receives exception signals generated by cache 150. Each local exception unit 670 generates local commit signals for an issue group according to the exception signals it receives from its local resources and the relative ordering of the instructions in the issue group. Local commit signals from different exception units are combined to form a global commit signal for each execution port 660.

Commit signals depend on which instructions raise exceptions, the relative ordering of the instructions, and the types of exceptions raised. For example, when a load check instruction raises an exception on an ALAT miss (load check failure), all instructions in the issue group that precede the load check instruction and the load check instruction itself are committed. Instructions that follow the load check instruction in execution are not retired until the exception (ALAT miss) is addressed. Thus, the relative ordering of the instructions determines which exception signals received by local exception unit 670 effect the local commit signals. If multiple instructions raise exceptions, only the exception raised by the first instruction in execution order is processed. If the excepting instruction raises more than one exception, only one exception is processed at a time. Accordingly, when an instruction raises multiple exceptions, these are prioritized to determine which to process first.

Figure 7:
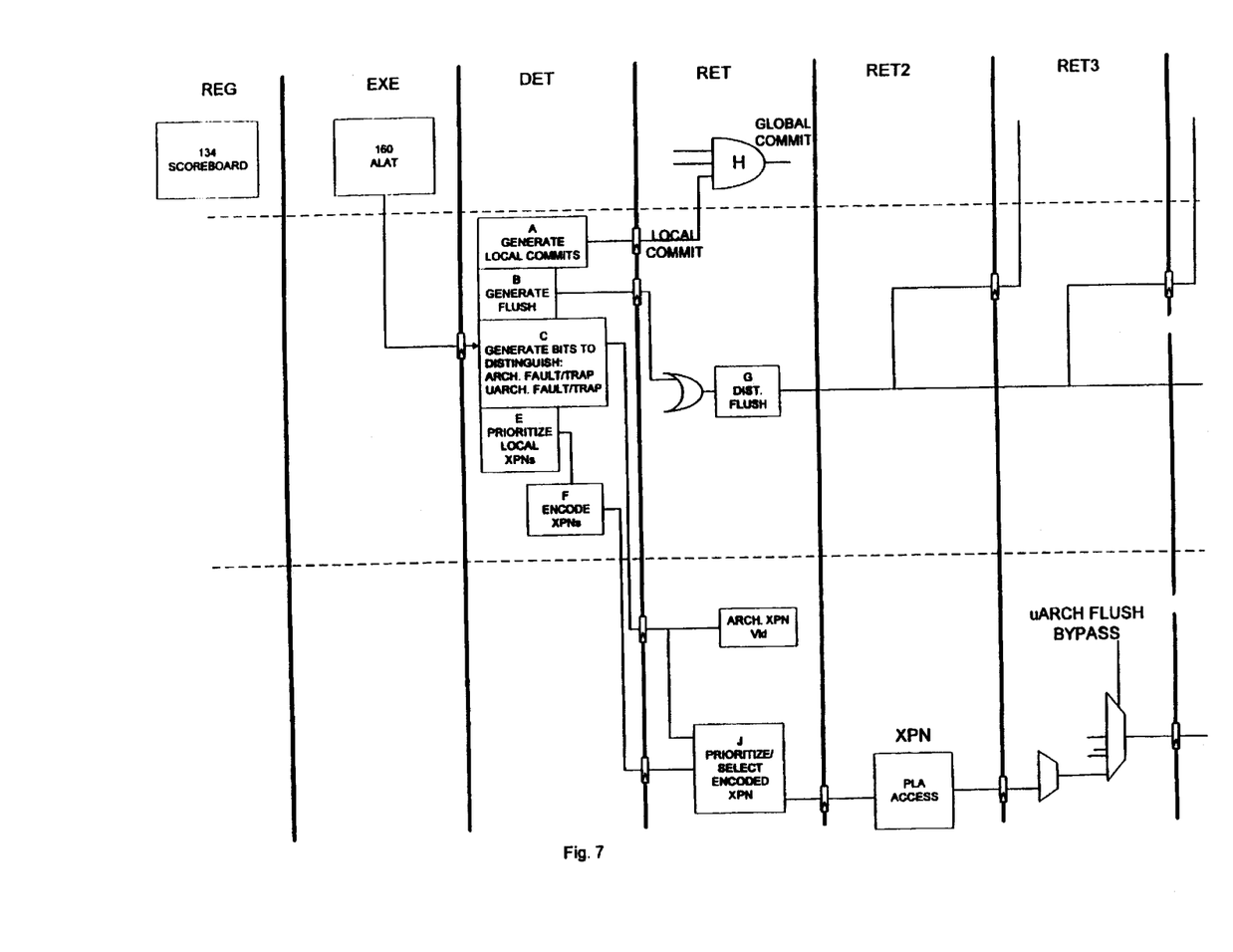
FIG. 7 is a block diagram of one embodiment of an instruction pipeline that may be implemented by the processor of FIG. 6.

FIG. 7 is a block diagram representing REG, EXE, DET, RET, etc. pipeline stages for the embodiment of XPN 170 of FIG. 6. The disclosed pipeline stages represent operations implemented by various blocks of local exception units 670 to handle a failing load check instruction through a microarchitectural trap mechanism. The top row represents operations at scoreboard 134, ALAT 160 and retirement ports 660 as load-type instructions, i.e. advanced loads, load checks, etc. transit the pipeline stage. The middle represents operations performed by a local exception units 670. For the disclosed embodiment of XPN 170, one local exception unit collects exception signals from the other local exception units, determines a highest priority or global exception, and generates a resteer address appropriate for the global exception. Operations that are unique to this unit are represented in the bottom row of FIG. 7.

For one embodiment of the present invention, an advanced load instruction sets a bit in scoreboard 134 in RET stage to indicate if data from the specified memory address is not yet available in the target register. For one embodiment of the invention, the associated load check instruction does not adjust this bit. This allows instructions that depend on the targeted data to proceed, using the data returned by the advanced load before it is validated by the load check.

An ALAT miss exception is generated in the EXE stage and communicated to its local exception unit in the DET stage. Signal transmission within a single clock cycle is made possible by coupling the ALAT to a nearby, i.e. local exception unit of XPN unit 170. Blocks A, B, C, E and F in the middle row of the DET stage represent the operations carried out by local exception unit 670(*c*) when it receives the ALAT miss exception signal and any other exception signals generated by the load check instruction or other instructions in the same issue group. Exceptions from other resources may be processed through local exception units 670(*a*), 670(*b*).

Block A processes exception signals to generate a local commit signal for each execution port 660. For example, resources associated with the various types of load and store instructions include scoreboard 134, ALAT 160 and MU 650(*n*). Local exception unit 670(*c*) ORs exception signals from these resources to determine whether the load check triggered an exception that affects the commit signal at execution port 660(*n*). Local exception unit 670(*c*) makes a similar determination for any other instructions in the issue group for which it receives relevant exception signals, and local exception units 670(*a*), 670(*b*) make similar determinations based on the signals they receive from their local resources. An order mask maps the exception signals from the various execution ports to the instructions of the issue group, and the first instruction in execution order that raised an exception is determined.

Local commit signals are generated by each local exception unit 670, based on signals from its local resources, and forwarded to each execution port 660 in the DET stage. Block (A) generates a local exception signal associated with a first instruction in execution order that raises an exceptional condition in any of the resources it monitors. For example, if a load check instruction triggers an ALAT miss exception, and it is the first instruction in execution order to do so, the exception signal for execution port 660(*n*) will be raised. Block (H) combines the local commit signals to provide a global commit signal, which indicates whether the load check instruction, which is currently in execution port 660(*n*), should be retired or ignored. Similar determinations are made for execution ports 660(*l*)–660(*n*–1).

Block (B) generates a flush signal that is distributed to resources of the processor when the corresponding local exception unit detects an exception. The flush signal(s) is used to clear the pipeline of all instructions which have not yet reached the RET stage. For example, instructions that follow the failing load check instruction in execution order are cleared (flushed), and the pipeline is resteered to an exception handler (method 500) or replay instruction (methods 300, 400).

If multiple exceptions are raised by a single instruction, these are prioritized in block (E) and encoded in block (F) in stage DET. The encoded, prioritized signals are forwarded to the central exception unit, along with signals characterizing the exception. For example, block (C) sets bits to indicate if the exception is an architectural trap, an architectural fault, a micro-architectural trap, or a micro-architectural fault. These bits indicate the nature of the local, highest priority exception to the central exception unit. Encoding the exception signals reduces the routing congestion.

For the disclosed embodiment, block J represents a signal collection point in the selected (coordinating) exception unit, e.g. local exception unit 670(*a*) in the disclosed embodiment of XPN 170. Signals from local exception units are collected in the RET stage by block J, which uses the signals to identify the global exception and resteer the pipeline to the appropriate exception handler or replay address. The global exception may be identified, for example, by determining from the available order information which encoded exception corresponds to the earliest instruction in execution order of the issue group. For the disclosed embodiment of XPN 170, the resteer address is available 2 clock cycles after the load check instruction is retired.

An alternative embodiment of the present invention may incorporate a branch in the check load operation to access an exception handler. For example, an offset provided in the check load instruction may be used to point to "fix-up code" for a failed check load. For this embodiment, the offset set is converted to a branch target address if the check load fails. This embodiment reduces the number of pipeline flushes over the number involved in implementing a typical exception handler.

There has thus been disclosed a mechanism for handling failing load check instructions. The load check instruction is deemed to fail when a (potential) collision is detected between an associated advanced load instruction and a relevant, undisambiguated store instruction. The mechanism converts a load check instruction to a load instruction when a collision is detected, flushes selected instructions, and resteers execution to a specified instruction. The mechanism may be implemented as a micro-architectural trap under control of an exception/commit system or a branch. For one embodiment of the invention, the resteer address is the address following the load check instruction. For another embodiment of the invention, the resteer address is an exception handler routine that identifies and re-executes any instructions that depend on the advanced load instruction and are scheduled ahead of the undisambiguated store. For yet another embodiment of the invention, a re-load operation associated with the load check operation is executed speculatively, i.e. before it is determined whether a collision occurred. For still another embodiment of the invention, the check load includes a branch operation that branches to "fix-up" code when a potential collision is detected.

Persons skilled in the art of processor design and having the benefit of this disclosure will recognize variations and modifications of the disclosed embodiments that none the less fall within the scope of the appended claims.

What is claimed is:

1. A method for processing load operations comprising:
    loading data from a memory at a memory address to a register in response to a first load instruction;

observing memory access associated with instructions executed between the first load instruction and a load check instruction;

updating a load tracking table responsive to observing a collision between the first load instruction and the executed instructions to store information on status of the memory address targeted by the first load instruction;

updating a scoreboard responsive to observing a collision between the first load instruction and the executed instructions to track data availability of the register;

checking the load tracking table, responsive to the load check instruction, to determine the status of the memory address; and converting the load check instruction to a load instruction if indicated by the checked status of the memory address.

2. The method of claim 1, further comprising executing a recovery operation if indicated by the checked status.

3. The method of claim 2, wherein executing a recovery operation further comprises:

identifying one or more instructions in an issue group that includes the load check instruction to retire;

flushing instructions that follow the load check; and indicating an address of a first instruction that follows the load check instruction as a resteer address.

4. The method of claim 1, further comprising executing a micro-architectural trap at the load check instruction when indicated by the checked status.

5. The method of claim 4, wherein executing the micro-architectural trap comprises:

retiring instructions in a current issue group up to and including the load check;

ignoring any in-flight instructions that follow the load check instruction.

6. The method of claim 5, wherein executing the microarchitectural trap further comprises:

setting a bit on the scoreboard to indicate that data from the memory address is not yet available in the register; and resteering instruction execution to a first instruction that follows the load check instruction.

7. The method of claim 1, further comprising branching to an error handler indicated by the load check instruction.

8. The method of claim 7, wherein branching to the error handler comprises:

determining an address for the error handler from an offset specified in the load check instruction; and jumping to the error handler.

9. A machine readable storage medium on which are stored instructions that are executable by a processor to implement a method for processing load operations, the method comprising:

processing an advanced load operation to load data from a memory address into a register;

observing memory access associated with instructions executed between the advanced load operation and a load check operation;

updating an advanced load address table responsive to observing a collision between the advanced load operation and the executed instructions to store information on status of the memory address targeted by the advance load operation;

updating a scoreboard responsive to observing a collision between the advanced load operation and the executed instructions to track data availability of the register;

processing a load check operation to determine a status of the data returned by the advanced load operation; and executing a micro-architectural trap when the status of the data indicates a failing load check operation.

10. The machine readable medium of claim 9, wherein processing a load check operation comprises:

reading the advanced load address table to determine whether a subsequent store operation collided with the advanced load operation; and triggering a reload operation to the memory address if a collision is indicated.

11. The machine readable medium of claim 9, wherein executing a microarchitectural trap comprises:

flushing selected instructions from an instruction execution pipeline; and resteering the instruction execution pipeline to a specified instruction.

12. The machine readable medium of claim 11, wherein updating the scoreboard comprises setting a bit to indicate the data from the memory address is not yet available in a target register.

13. The machine readable medium of claim 11, wherein the specified instruction is a first instruction following the load check operation.

14. The machine readable medium of claim 11, wherein the specified instruction is a first instruction in an error handling routine.

15. The machine readable medium of claim 14, wherein the error handling routine identifies instructions that depend on data returned by the advanced load operation and reexecutes these instructions.

16. The machine readable medium of claim 9, wherein executing a micro-architectural trap comprises:

flushing selected instructions from an instruction execution pipeline;

executing a recovery routine to identify one or more retired instructions that used data returned by the advanced load operation; and re-executing the identified instructions using data updated by the subsequent store operation.

17. The machine readable medium of claim 16, wherein the method further comprises resteering the instruction execution pipeline to an instruction following the check load operation when the recovery routine completes.

18. A processor comprising:

a fetch unit to provide instructions for execution;

an advanced load address table (ALAT) to store status information for a memory address targeted by an advanced load instruction;

a scoreboard to keep track of data availability of one or more registers;

a snoop unit to track load and store operations and to update the status information;

an exception unit to trigger a micro-architectural trap when indicated by the status information.

19. The processor of claim 18, wherein the status information is read in response to a load check instruction and the exception unit triggers the micro-architectural trap when the status information indicates the load check instruction failed.

20. The processor of claim 18, wherein the exception unit flushes selected instructions and provides a resteer address to the fetch unit.

21. The processor of claim 20, wherein the resteer address indicates a first instruction that follows the load check instruction in execution order.

22. The processor of claim 21, wherein the resteer address indicates a first instruction in a recovery routine.

23. The computer system of claim 22, wherein exception unit triggers a conversion of the load check instruction to a load instruction when the load check instruction triggers an ALAT miss exception.

24. The computer system of claim 23, further comprising a cache controller.

25. The computer system of claim 24, wherein the cache controller converts the load check instruction to a load instruction responsive to a signal from the exception unit.

26. The computer system of claim 22, wherein the memory includes an error handler and the exception unit resteers the fetch unit to the error handler when the load check instruction triggers an ALAT miss exception.

27. The computer system of claim 26, wherein the load check instruction includes an indication of a memory address associated with the error handler and the exception unit branches to the indicated memory address when the load check instruction triggers an ALAT miss exception.

28. A computer system comprising:
a memory to store a computer program, the computer program including an advanced load instruction and a load check instruction;
a processor to execute instructions stored in the memory, the processor including:
 a fetch unit to retrieve instructions from the memory;
 an ALAT to track status information on data targeted by the advanced load instruction;
 a scoreboard to keep track of data availability of one or more registers;
 a snoop unit to update the status information in response to load and store operations; and
 an exception unit to retire instructions selectively according to monitored exception signals, the exception unit to flush one or more instructions and resteer the fetch unit to a specified address when the load check instruction triggers an ALAT miss exception.

\* \* \* \* \*

UNITED STATES PATENT AND TRADEMARK OFFICE
CERTIFICATE OF CORRECTION

PATENT NO. : 6,598,156 B1
DATED : July 22, 2003
INVENTOR(S) : Arora

It is certified that error appears in the above-identified patent and that said Letters Patent is hereby corrected as shown below:

Column 13,
Lines 3 and 12, delete "22," and insert -- 28 --.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,598,156 B1
DATED : July 22, 2003
INVENTOR(S) : Arora

Page 1 of 1

It is certified that error appears in the above-identified patent and that said Letters Patent is hereby corrected as shown below:

<u>Column 1,</u>
Line 32, before "more", delete "so".

Signed and Sealed this

Twenty-first Day of June, 2005

JON W. DUDAS
*Director of the United States Patent and Trademark Office*